US008725568B2

(12) United States Patent
Cervenka et al.

(10) Patent No.: US 8,725,568 B2
(45) Date of Patent: *May 13, 2014

(54) COUPON BEARING SPONSOR ACCOUNT TRANSACTION AUTHORIZATION

(71) Applicant: Visa International Service Association, San Francisco, CA (US)

(72) Inventors: Karen Louise Cervenka, Belmont, CA (US); Mary Theresa Taylor, San Francisco, CA (US); Gwen Diane Ma, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,910

(22) Filed: May 13, 2013

(65) Prior Publication Data

US 2013/0254004 A1    Sep. 26, 2013

Related U.S. Application Data

(63) Continuation of application No. 12/860,578, filed on Aug. 20, 2010, now Pat. No. 8,463,706.

(60) Provisional application No. 61/236,455, filed on Aug. 24, 2009.

(51) Int. Cl.
*G06Q 30/00* (2012.01)
*G06Q 30/02* (2012.01)
*H04M 3/487* (2006.01)
*G06Q 30/06* (2012.01)

(52) U.S. Cl.
CPC ........ *G06Q 30/0251* (2013.01); *G06Q 30/0241* (2013.01); *G06Q 30/0601* (2013.01); *G06Q 30/0277* (2013.01); *G06Q 30/00* (2013.01); *H04M 3/4878* (2013.01)
USPC .................... 705/14.49; 705/14.4; 705/14.57; 705/14.58; 705/14.73; 705/50

(58) Field of Classification Search
CPC .......... G06Q 30/0251; G06Q 30/0241; G06Q 30/0601; G06Q 30/0277; G06Q 30/00; H04M 3/4878
USPC ............ 705/14.4, 14.49, 14.57–14.58, 14.73, 705/50
See application file for complete search history.

(56) References Cited

U.S. PATENT DOCUMENTS 4,941,090 A    7/1990   McCarthy
5,025,372 A    6/1991   Burton et al.
(Continued)

FOREIGN PATENT DOCUMENTS

JP    2003502763    1/2003
JP    2004303015    10/2004
(Continued)

OTHER PUBLICATIONS

International Patent Application PCT/US2010/024057, International Search Report & Written Opinion, Sep. 28, 2010.
(Continued)

*Primary Examiner* — Calvin Cheung
(74) *Attorney, Agent, or Firm* — Greenberg Traurig LLP

(57) ABSTRACT

A transaction handler receives, for forwarding to a sponsor account's issuer, a coupon authorization request message from a merchant's acquirer that identifies the sponsor account and a coupon for an item being purchased by a consumer in a transaction with the merchant. The issuer determines eligibility of the coupon for use by the consumer, and sends an authorization response message to the merchant via its acquirer and the transaction handler for the application of a corresponding discount for the item when the coupon is eligible. One or more coupon eligibilities for the purchase of the item by the consumer from the merchant can be derived from comparisons of the transaction to predetermined times, geographies, jurisdictions, sets of merchants, and/or the number of times that coupons have been used in other transactions. The transaction handler can further process the transaction for authorization the consumer's account to pay of the transaction.

13 Claims, 6 Drawing Sheets

(56) References Cited

U.S. PATENT DOCUMENTS

| | | |
|---|---|---|
| 5,117,355 A | 5/1992 | McCarthy |
| 5,202,826 A | 4/1993 | McCarthy |
| 5,287,268 A | 2/1994 | McCarthy |
| 5,689,100 A | 11/1997 | Carrithers et al. |
| 5,774,870 A | 6/1998 | Storey |
| RE36,116 E | 2/1999 | McCarthy |
| 5,923,016 A | 7/1999 | Fredregill et al. |
| 5,937,391 A | 8/1999 | Ikeda et al. |
| 5,956,694 A | 9/1999 | Powell |
| 6,032,136 A | 2/2000 | Brake, Jr. et al. |
| 6,138,911 A | 10/2000 | Fredregill et al. |
| 6,243,687 B1 | 6/2001 | Powell |
| 6,251,017 B1 | 6/2001 | Leason et al. |
| 6,332,126 B1 | 12/2001 | Peirce et al. |
| 6,334,108 B1 | 12/2001 | Deaton et al. |
| 6,336,099 B1 | 1/2002 | Barnett et al. |
| 6,341,353 B1 | 1/2002 | Herman et al. |
| 6,408,286 B1 | 6/2002 | Heiden |
| 6,450,407 B1 | 9/2002 | Freeman et al. |
| 6,594,640 B1 | 7/2003 | Postrel |
| 6,606,745 B2 | 8/2003 | Maggio |
| 6,663,105 B1 | 12/2003 | Sullivan et al. |
| 6,721,743 B1 | 4/2004 | Sakakibara |
| 6,741,968 B2 | 5/2004 | Jacoves et al. |
| 6,748,365 B1 | 6/2004 | Quinlan et al. |
| 6,820,061 B2 | 11/2004 | Postrel |
| 6,829,586 B2 | 12/2004 | Postrel |
| 6,842,739 B2 | 1/2005 | Postrel |
| 6,856,820 B1 | 2/2005 | Kolls |
| 6,865,547 B1 | 3/2005 | Brake, Jr. et al. |
| 6,947,898 B2 | 9/2005 | Postrel |
| 6,978,250 B1 | 12/2005 | Kawan et al. |
| 7,054,830 B1 | 5/2006 | Eggleston |
| 7,072,864 B2 | 7/2006 | Brake, Jr. et al. |
| 7,096,190 B2 | 8/2006 | Postrel |
| 7,134,087 B2 | 11/2006 | Bushold et al. |
| 7,163,145 B2 | 1/2007 | Cohagan et al. |
| 7,263,507 B1 | 8/2007 | Brake, Jr. et al. |
| 7,370,811 B2 | 5/2008 | Turner et al. |
| 7,376,580 B1 | 5/2008 | Walker et al. |
| 7,398,225 B2 | 7/2008 | Voltmer et al. |
| 7,424,617 B2 | 9/2008 | Boyd et al. |
| 7,428,498 B2 | 9/2008 | Voltmer et al. |
| 7,606,730 B2 | 10/2009 | Antonucci |
| 7,624,041 B2 | 11/2009 | Postrel |
| 7,665,660 B2 | 2/2010 | Degliantoni et al. |
| 7,680,688 B2 | 3/2010 | Hessburg et al. |
| 7,742,943 B2 | 6/2010 | Postrel |
| 7,753,264 B2 | 7/2010 | Shafer et al. |
| 7,765,124 B2 | 7/2010 | Postrel |
| 7,769,630 B2 | 8/2010 | Postrel |
| 7,777,053 B2 | 8/2010 | Sanganbhatla |
| 7,828,206 B2 | 11/2010 | Hessburg et al. |
| 7,853,529 B1 | 12/2010 | Walker et al. |
| 7,868,218 B2 | 1/2011 | Clark et al. |
| 7,870,022 B2 | 1/2011 | Bous et al. |
| 7,894,634 B2 | 2/2011 | Chung |
| 8,010,405 B1 | 8/2011 | Bortolin et al. |
| 8,046,256 B2 | 10/2011 | Chien et al. |
| 8,155,999 B2 | 4/2012 | de Boer et al. |
| 8,180,671 B2 | 5/2012 | Cohagan et al. |
| 8,265,993 B2 | 9/2012 | Chien et al. |
| 8,285,643 B2 | 10/2012 | Isaacson et al. |
| 8,301,593 B2 | 10/2012 | Hoffmann |
| 8,302,030 B2 | 10/2012 | Soroca |
| 8,313,023 B1 | 11/2012 | Mcghie et al. |
| 8,315,929 B2 | 11/2012 | Allen-Rouman et al. |
| 8,332,290 B1 | 12/2012 | Venturo et al. |
| 8,342,399 B1 | 1/2013 | McGhie et al. |
| 8,401,967 B1 | 3/2013 | Postrel |
| 8,478,640 B2 | 7/2013 | Postrel |
| 8,511,550 B1 | 8/2013 | McGhie et al. |
| 2001/0034654 A1* | 10/2001 | Vigil et al. .................. 705/14 |
| 2001/0054003 A1 | 12/2001 | Chien et al. |
| 2002/0046116 A1 | 4/2002 | Hohle et al. |
| 2002/0052860 A1* | 5/2002 | Geshwind ....................... 706/62 |
| 2002/0160761 A1 | 10/2002 | Wolfe |
| 2003/0004808 A1 | 1/2003 | Elhaoussine et al. |
| 2003/0040964 A1 | 2/2003 | Lacek |
| 2003/0216967 A1 | 11/2003 | Williams |
| 2003/0225618 A1 | 12/2003 | Hessburg et al. |
| 2003/0236704 A1 | 12/2003 | Antonucci |
| 2003/0236712 A1 | 12/2003 | Antonucci et al. |
| 2004/0049423 A1 | 3/2004 | Kawashima et al. |
| 2004/0083170 A1 | 4/2004 | Bam et al. |
| 2004/0104760 A1 | 6/2004 | Ando |
| 2004/0117250 A1 | 6/2004 | Lubow et al. |
| 2004/0133472 A1 | 7/2004 | Leason et al. |
| 2004/0138949 A1 | 7/2004 | Darnton et al. |
| 2004/0186773 A1 | 9/2004 | George et al. |
| 2004/0203648 A1 | 10/2004 | Wong |
| 2004/0238622 A1 | 12/2004 | Freiberg |
| 2004/0249710 A1 | 12/2004 | Smith et al. |
| 2004/0260608 A1 | 12/2004 | Lewis et al. |
| 2005/0010533 A1 | 1/2005 | Cooper |
| 2005/0021399 A1 | 1/2005 | Postrel |
| 2005/0021401 A1 | 1/2005 | Postrel |
| 2005/0060225 A1 | 3/2005 | Postrel |
| 2005/0080727 A1 | 4/2005 | Postrel |
| 2005/0091152 A1 | 4/2005 | Suisa |
| 2005/0096975 A1* | 5/2005 | Moshe ........................... 705/14 |
| 2005/0114213 A1 | 5/2005 | Smith et al. |
| 2005/0119938 A1 | 6/2005 | Smith et al. |
| 2005/0149394 A1 | 7/2005 | Postrel |
| 2005/0205666 A1 | 9/2005 | Ward et al. |
| 2005/0240472 A1 | 10/2005 | Postrel |
| 2005/0240478 A1 | 10/2005 | Lubow et al. |
| 2006/0010033 A1 | 1/2006 | Thomas |
| 2006/0020511 A1 | 1/2006 | Postrel |
| 2006/0053056 A1 | 3/2006 | Alspach-Goss et al. |
| 2006/0059040 A1 | 3/2006 | Eldred et al. |
| 2006/0129456 A1 | 6/2006 | Walker |
| 2006/0136299 A1 | 6/2006 | Ruhmkork |
| 2006/0184419 A1 | 8/2006 | Postrel |
| 2006/0190337 A1 | 8/2006 | Ayers, Jr. |
| 2006/0206376 A1 | 9/2006 | Gibbs et al. |
| 2006/0208065 A1 | 9/2006 | Mendelovich et al. |
| 2006/0253321 A1 | 11/2006 | Heywood |
| 2006/0259364 A1 | 11/2006 | Strock et al. |
| 2006/0287943 A1 | 12/2006 | Postrel |
| 2007/0005416 A1 | 1/2007 | Jackson et al. |
| 2007/0011044 A1 | 1/2007 | Hansen |
| 2007/0038515 A1 | 2/2007 | Postrel |
| 2007/0043613 A1* | 2/2007 | Longest ....................... 705/14 |
| 2007/0043619 A1 | 2/2007 | Leason et al. |
| 2007/0043620 A1 | 2/2007 | Leason et al. |
| 2007/0078719 A1 | 4/2007 | Schmitt et al. |
| 2007/0100691 A1 | 5/2007 | Patterson et al. |
| 2007/0105536 A1* | 5/2007 | Tingo, Jr. .................. 455/414.1 |
| 2007/0112629 A1 | 5/2007 | Solomon |
| 2007/0129955 A1 | 6/2007 | Dalmia et al. |
| 2007/0130011 A1 | 6/2007 | Postrel |
| 2007/0143178 A1 | 6/2007 | Citrin et al. |
| 2007/0192784 A1 | 8/2007 | Postrel |
| 2007/0198338 A1 | 8/2007 | Heywood |
| 2007/0214049 A1 | 9/2007 | Postrel |
| 2007/0226059 A1 | 9/2007 | Postrel |
| 2007/0260509 A1 | 11/2007 | Hines et al. |
| 2007/0288313 A1 | 12/2007 | Brodson |
| 2008/0010154 A1 | 1/2008 | Tietzen et al. |
| 2008/0021784 A1 | 1/2008 | Hessburg et al. |
| 2008/0040222 A1 | 2/2008 | Gee |
| 2008/0040270 A1 | 2/2008 | Buchheit et al. |
| 2008/0059303 A1 | 3/2008 | Fordyce, III |
| 2008/0071640 A1 | 3/2008 | Nguyen |
| 2008/0077499 A1 | 3/2008 | Ariff et al. |
| 2008/0103968 A1 | 5/2008 | Bies et al. |
| 2008/0120221 A1 | 5/2008 | Toneguzzo |
| 2008/0133350 A1 | 6/2008 | White et al. |
| 2008/0133351 A1 | 6/2008 | White et al. |
| 2008/0154676 A1 | 6/2008 | Suk |
| 2008/0154722 A1 | 6/2008 | Galinos |
| 2008/0177627 A1 | 7/2008 | Cefail |
| 2008/0201224 A1 | 8/2008 | Owens et al. |

(56) References Cited

U.S. PATENT DOCUMENTS

| | | |
|---|---|---|
| 2008/0221986 A1* | 9/2008 | Soicher et al. ............... 705/14 |
| 2008/0228563 A1 | 9/2008 | Zellner et al. |
| 2008/0228583 A1 | 9/2008 | MacDonald |
| 2008/0249861 A1 | 10/2008 | Carotta et al. |
| 2008/0313034 A1 | 12/2008 | Wise |
| 2009/0006203 A1 | 1/2009 | Fordyce, III et al. |
| 2009/0018909 A1 | 1/2009 | Grecia |
| 2009/0030793 A1 | 1/2009 | Fordyce, III |
| 2009/0048916 A1 | 2/2009 | Nuzum et al. |
| 2009/0076911 A1* | 3/2009 | Vo et al. ..................... 705/14 |
| 2009/0076912 A1* | 3/2009 | Rajan et al. ................. 705/14 |
| 2009/0106112 A1 | 4/2009 | Dalmia et al. |
| 2009/0106115 A1 | 4/2009 | James et al. |
| 2009/0106300 A1 | 4/2009 | Brown |
| 2009/0112721 A1 | 4/2009 | Hammad et al. |
| 2009/0176580 A1 | 7/2009 | Herrmann et al. |
| 2009/0198572 A1 | 8/2009 | Jurgens |
| 2009/0271262 A1 | 10/2009 | Hammad |
| 2009/0292595 A1* | 11/2009 | Tonnison et al. ............. 705/11 |
| 2009/0307118 A1 | 12/2009 | Baumgartner, IV |
| 2009/0307130 A1 | 12/2009 | Tan |
| 2010/0030688 A1 | 2/2010 | Patterson |
| 2010/0042517 A1 | 2/2010 | Paintin et al. |
| 2010/0057551 A1 | 3/2010 | Blaisdell |
| 2010/0057553 A1 | 3/2010 | Ameiss et al. |
| 2010/0075638 A1 | 3/2010 | Carlson |
| 2010/0076820 A1 | 3/2010 | Davis |
| 2010/0125737 A1 | 5/2010 | Kang |
| 2010/0145855 A1 | 6/2010 | Fordyce, III et al. |
| 2010/0174596 A1 | 7/2010 | Gilman et al. |
| 2010/0211445 A1 | 8/2010 | Bodington |
| 2010/0211469 A1 | 8/2010 | Salmon |
| 2010/0274659 A1 | 10/2010 | Antonucci et al. |
| 2010/0306032 A1 | 12/2010 | Jolley |
| 2010/0312626 A1 | 12/2010 | Cervenka |
| 2010/0312631 A1 | 12/2010 | Cervenka |
| 2010/0312632 A1 | 12/2010 | Cervenka |
| 2010/0312633 A1 | 12/2010 | Cervenka |
| 2010/0312634 A1 | 12/2010 | Cervenka |
| 2010/0312635 A1 | 12/2010 | Cervenka |
| 2011/0022448 A1 | 1/2011 | Strock et al. |
| 2011/0022514 A1 | 1/2011 | Lal |
| 2011/0047019 A1 | 2/2011 | Cervenka |
| 2011/0066483 A1 | 3/2011 | Salmon et al. |
| 2011/0082739 A1 | 4/2011 | Pourfallah |
| 2011/0087530 A1 | 4/2011 | Fordyce, III |
| 2011/0087531 A1 | 4/2011 | Winters et al. |
| 2011/0145148 A1 | 6/2011 | Hammad |
| 2011/0161230 A1 | 6/2011 | Singh |
| 2011/0191417 A1* | 8/2011 | Rathod ...................... 709/204 |
| 2011/0218868 A1 | 9/2011 | Young et al. |
| 2011/0231258 A1 | 9/2011 | Winters et al. |
| 2011/0238483 A1 | 9/2011 | Yoo et al. |
| 2011/0276493 A1 | 11/2011 | Graham, III et al. |
| 2011/0276495 A1 | 11/2011 | Varadarajan et al. |
| 2011/0288918 A1 | 11/2011 | Cervenka |
| 2011/0295675 A1 | 12/2011 | Reodica |
| 2012/0010940 A1 | 1/2012 | Masi |
| 2012/0035998 A1 | 2/2012 | Chien et al. |
| 2012/0041812 A1 | 2/2012 | Postrel |
| 2012/0101881 A1 | 4/2012 | Taylor et al. |
| 2012/0123849 A1 | 5/2012 | Armstrong |
| 2012/0179531 A1 | 7/2012 | Kim |
| 2012/0191525 A1 | 7/2012 | Singh |
| 2012/0215610 A1 | 8/2012 | Amaro et al. |
| 2012/0215624 A1 | 8/2012 | Ramer et al. |
| 2012/0215638 A1 | 8/2012 | Bennett et al. |
| 2012/0221446 A1 | 8/2012 | Grigg et al. |
| 2012/0226545 A1 | 9/2012 | Gebb et al. |
| 2012/0226604 A1 | 9/2012 | Isaacson et al. |
| 2012/0239477 A1 | 9/2012 | Cueli |
| 2012/0245987 A1 | 9/2012 | Isaacson |
| 2012/0267432 A1 | 10/2012 | Kuttuva |
| 2012/0271689 A1 | 10/2012 | Etheredge et al. |
| 2012/0271691 A1 | 10/2012 | Hammad et al. |
| 2012/0271697 A1 | 10/2012 | Gilman et al. |
| 2012/0290950 A1 | 11/2012 | Rapaport |
| 2012/0303425 A1 | 11/2012 | Katzin et al. |
| 2012/0316945 A1 | 12/2012 | Wolf et al. |
| 2012/0323663 A1 | 12/2012 | Leach |
| 2013/0006848 A1 | 1/2013 | Kuttuva |
| 2013/0060679 A1 | 3/2013 | Oskolkov et al. |
| 2013/0151401 A1 | 6/2013 | Scipioni et al. |

FOREIGN PATENT DOCUMENTS

| | | |
|---|---|---|
| KR | 20010083521 | 9/2001 |
| KR | 20010096673 | 11/2001 |
| KR | 1020020050219 | 6/2002 |
| KR | 20030080111 | 10/2003 |
| KR | 1020040016771 | 2/2004 |
| KR | 20040028110 | 4/2004 |
| KR | 1020040040253 | 5/2004 |
| KR | 1020040077077 | 9/2004 |
| KR | 1020050061661 | 6/2005 |
| KR | 20060101241 | 9/2006 |
| KR | 100717590 | 5/2007 |
| KR | 1020070110241 | 11/2007 |
| KR | 100836484 | 6/2008 |
| KR | 20080102439 | 11/2008 |
| MX | PA1013136 | 6/2004 |
| WO | 0079461 | 12/2000 |
| WO | 2006121541 | 11/2006 |
| WO | 2008016923 | 2/2008 |
| WO | 2008102935 | 8/2008 |
| WO | 2010093893 | 8/2010 |
| WO | 2010135642 | 11/2010 |
| WO | 2011028486 | 3/2011 |
| ZA | 200200475 | 6/2003 |

OTHER PUBLICATIONS

International Patent Application PCT/US2010/035769, International Search Report and Written Opinion, Jan. 12, 2011.
International Patent Application PCT/US2010/037646, International Search Report and Written Opinion, Jan. 18, 2011.
International Patent Application PCT/US2010/046360, International Seach Report and Written Opinion, Mar. 30, 2011.
International Patent Application PCT/US2012/059607, International Search Report and Written Opinion, Mar. 15, 2013.
International Patent Application PCT/US2012/068541, International Search Report and Written Opinion, Mar. 20, 2013.
International Patent Application PCT/US2013/023642 International Search Report and Written Opinion, May 30, 2013.
International Patent Application PCT/US2013/032307 International Search Report and Written Opinion, Jun. 26, 2013.

* cited by examiner

COUPON BEARING SPONSOR ACCOUNT TRANSACTION AUTHORIZATION

RELATED APPLICATIONS

This application is a continuation application of U.S. application Ser. No. 12/860,578, filed on Aug. 20, 2010, titled "Coupon Bearing Sponsor Account for Payment Processing System Redemption," which application claims priority to, and the benefit of, U.S. Provisional Application Ser. No. 61/236,455, filed on Aug. 24, 2009, titled "Coupon Bearing Sponsor Account for Payment Processing System Redemption," the entire disclosures of which applications are incorporated herein by reference.

FIELD OF THE TECHNOLOGY

The present invention is related to a transaction between a merchant and a consumer, and is more particularly related to a discount on such a transaction, and is most particularly related to a coupon being presented by the consumer to the merchant to obtain the discount on the transaction.

BACKGROUND

Merchants and manufacturers distribute coupons that give consumers an incentive to buy their goods and services by way of a discount typically applied at the point of sale. Consumers obtain paper coupons in a variety of ways. They may cut them out of a newspaper or receive them at a Point of Service (POS) terminal when making a purchase. Sometimes paper coupons are mailed to consumers by the sponsor of the coupon or its agent. When a coupon is used a consumer with a merchant, the merchant gives the consumer a discount on a purchase of a good or service. Thereafter, the merchant seeks reimbursement for the discount from one or more sponsors of the coupon. The process undertaken by the merchant to be reimbursed can be cumbersome and fraught with latency in being repaid. Typically, the merchant, or its agent, collects all coupons received from consumers, sorts them by their respective sponsors, and then sends them in bulk to each sponsor. The sponsor then reimburses the merchant, but not until after the sponsor has inspected and verified that the submitted coupons are in compliance with terms and conditions of the coupon and its discount.

It would be an advantage in the relevant arts to provide a coupon, and process for its use, that is likely to make the reimbursement process more efficient for the merchant, for the sponsor of the coupon, and for the consumer.

SUMMARY OF THE DESCRIPTION

In one implementation, a coupon authorization request message is received from a merchant that identifies a sponsor account and a coupon for an item being purchased by a consumer in a transaction with the merchant. The coupon authorization request message is sent to an issuer of the sponsor account. In response to the coupon authorization request message, a coupon authorization response message is received containing eligibility of the coupon for use by the consumer for the purchase of the item in the transaction with the merchant. The coupon authorization response message is sent to the merchant. A consumer authorization request message is received from the merchant identifying a consumer account upon which the transaction with the merchant is to be conducted. The consumer authorization request message is sent to an issuer of the consumer account. In response to the consumer authorization request message, a consumer authorization response message is received from the issuer of the consumer account, where the consumer authorization response message identifies the eligibility of the consumer account for use to conduct the transaction with the merchant. The consumer authorization response message is sent to the merchant. Multiple coupons can each be processed in this implementation for the transaction.

In another implementation there is received, at an address corresponding to an issuer of a sponsor account, from an address of a transaction handler via an address for an acquirer for a merchant that is conducting a transaction with a consumer, an authorization request message originating from an address of the merchant. The authorization request message includes information sufficient to identify the sponsor account and a coupon for an item being purchased by the consumer in the transaction with the merchant. Using the information in the authorization request message, coupon eligibility data pertaining to the sponsor account and the coupon is retrieved. A determination is made, using the coupon eligibility data, as to the eligibility of the coupon for use by the consumer for the purchase of the item in the transaction with the merchant. In response to the authorization request message, an authorization response message is sent for delivery to the address corresponding to the merchant via addresses respectively corresponding to the transaction handler and the merchant's acquirer. The authorization response message includes an identifier corresponding to eligibility of the coupon for use by the consumer for the purchase of the item in the transaction with the merchant.

In the foregoing implementation, the retrieved coupon eligibility data is sufficient to determine various eligibility criteria, including whether (i) the time of the transaction is within a predetermined time within which the coupon is eligible for use to purchase the item; (ii) a location within which the transaction is taking place is within a predetermined geography within which the coupon is eligible for use to purchase the item; (iii) a jurisdiction within which the transaction is taking place is within a predetermined jurisdiction within which the coupon is eligible for use to purchase the item; (iv) the merchant is with a predetermined set of merchants from whom the coupon is eligible for the purchase of the item; (v) etc.

In yet another implementation, there is received, at an address corresponding to an issuer of a sponsor account from an address of a transaction handler via an address for an acquirer for a merchant that is conducting a transaction with a consumer, an authorization request message originating from an address of the merchant. The authorization request message includes information sufficient to identify the sponsor account and a Globally Unique IDentifier (GUID) for a coupon for an item being purchased by the consumer in the transaction with the merchant. Using the information in the authorization request message, a retrieval is made of a predetermined set of conditions for use of the coupon for the purchase of the item in the transaction with the merchant and a currency available balance of the sponsor account. Using the retrieved predetermined set of conditions for use of the coupon for the purchase of the item in the transaction with the merchant and the retrieved currency available balance of the sponsor account, a determination is made as to the eligibility of the coupon for use by the consumer for the purchase of the item in the transaction with the merchant. In response to the authorization request message, an authorization response message is sent for delivery to the address corresponding to the merchant via addresses respectively corresponding to the transaction handler and the merchant's acquirer. The authorization response message includes an identifier corresponding to eligibility of the coupon for use by the consumer for the purchase of the item in the transaction with the merchant.

In the foregoing implementation, information in the authorization request message includes data sufficient to derive various eligibility criteria, including whether (i) the time of the transaction is within the time of the predetermined set of conditions within which the coupon is eligible for use to purchase the item; (ii) a location within which the transaction is taking place is within the geography of the predetermined set of conditions within which the coupon is eligible for use to purchase the item; (iii) a jurisdiction within which the transaction is taking place is within the jurisdiction within which the coupon is eligible for use to purchase the item; (iv) the merchant is with the set of said merchants from whom the coupon is eligible for the purchase of the item; (v) etc.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

Figure 1:
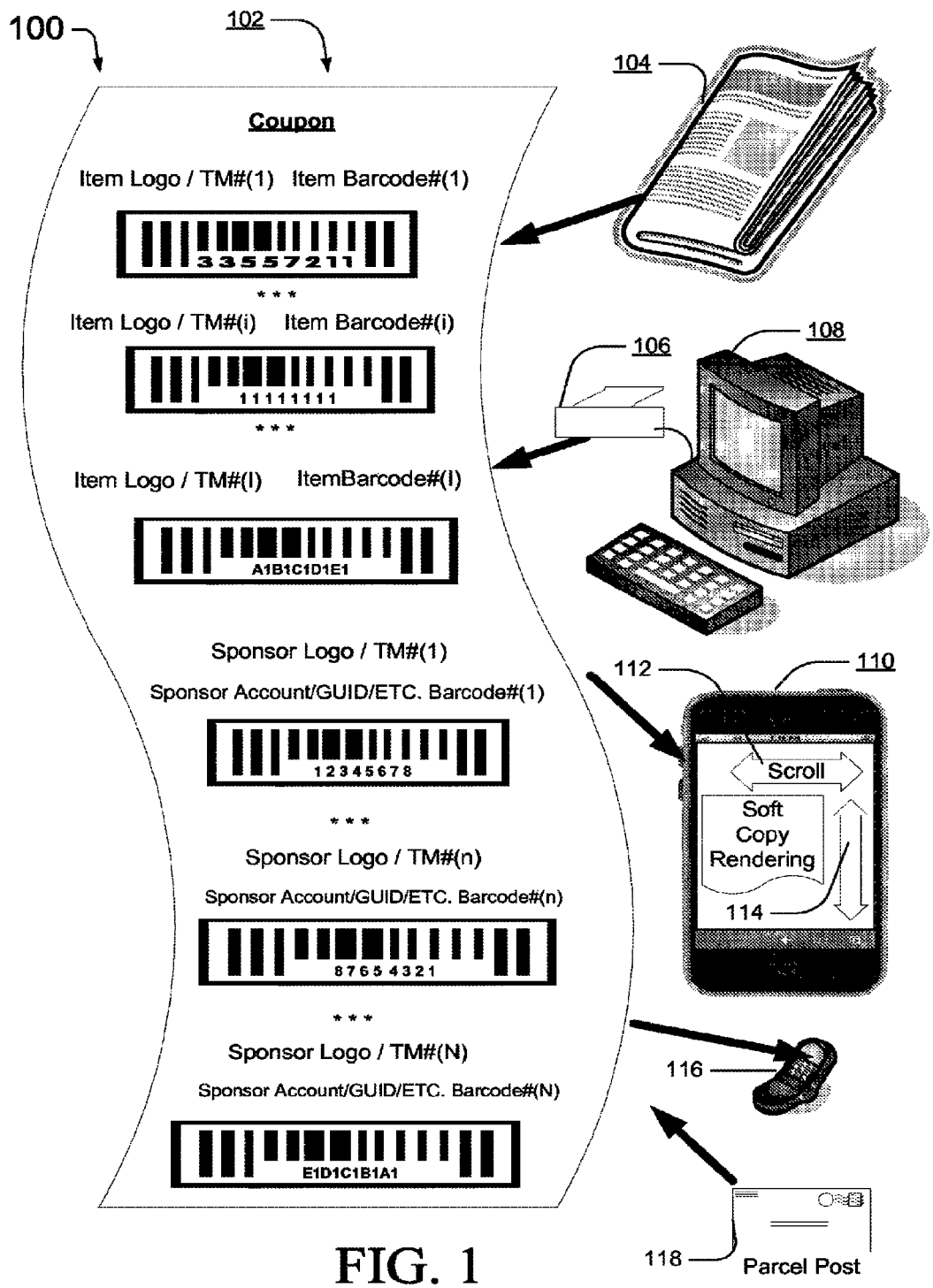
FIG. 1 illustrates an exemplary implementation of a coupon and delivery mode for use of same by a consumer.

Disclosed implementations include a coupon, either in soft or hard copy, having, in visually displayed data encoded thereon, an identifier corresponding to an account issued to a sponsor who is financially responsible for reimbursement of a merchant that receives the coupon from a consumer and gives the consumer a discount for the purchase of a good or service from the merchant. The visually displayed data that encodes the identifier corresponding to the account can be a barcode that can be read by an optical scanner. Following authorization of the account's use though a payment processing system, the merchant is reimbursed from the account through clearing and settlement in the payment processing system. The identified account can correspond to one or more sponsors who are financially responsible to reimburse the merchant for the discount on the good or service to the consumer. As such, the discount on the cost of the good or service to the consumer, and its guaranteed reimbursement to the merchant, can be provided in real time via the payment processing system.

A coupon can be used by a consumer to obtain a discount from a merchant on a purchase of a good or service. A surface of the coupon bears an identifier for an account from which the merchant will be reimbursed for the discount. In various implementations, an issuer of an account partners with a sponsor who will be financially responsible for reimbursing the merchant for the discount. The account would provide funds, supplied by one or more sponsors, to the merchant to reimburse them for discounts given to consumers from whom valid coupons were received according to any eligibility terms and conditions thereof. The coupon will have indicia borne on a surface thereof that can be captured by an optical scanner (one dimensional barcode, matrix code or two dimensional barcode, other symbologies that map data to a symbol, etc.) The visual image that is captured by the optical scanner can be analyzed to derive therefrom an identifier for the account of the one or more sponsors. The derived account identifier is used to facilitate authorization, clearing, and settlement. The authorization, clearing, and settlement can be typical for related systems and processes that such merchants would typically use for other transactions with consumer-account holders who conduct transactions on accounts that are processed by a payment processing network.

The scanning of indicia borne on the surface of the coupon can be performed by an optical scanner in communication with a Point-of-Server terminal (POS) of the merchant, by a digital photograph of the indicia captured by a camera feature of a consumer's cellular telephone, or by another optical scanning device. In any case, an account identifier is derived from the captured image for communication to an acquirer for the merchant to facilitate authorization, clearing, and settlement. The communication of the account identifier to the acquirer can by any known telecommunications capability.

FIG. 1 shows at reference numeral 100 a coupon 102 and various delivery methodology symbols 104-118. Coupon 102 has from 1 to I item identifiers. Each item identifier (i) visually identifies a good or service by way of information such as a logo and/or trademark. Each item identifier (i) also identifies the good or service by way of data encoded in visible indicia that can be read by being scanned by an optical scanner in communication with a Point-of-Server terminal (POS). A digital image of the coupon that is read by the optical scanner can be analyzed to derive therefrom an identifier for the item. The identifier for the item can be a Stock Keeping Unit (SKU), a Universal Product Code (UPC), a drug product code, a serial number or other Globally Unique IDentifer (GUID) for the item from other such items, etc. The digital image that is read (i.e.; item identifier (i)) and analyzed for each identifier for each item can be a barcode, as is seen on coupon 102 in FIG. 1.

Coupon 102 has from 1 to N sponsor identifiers. Each sponsor identifier (n) visually identifies a sponsor, or agent thereof, who is financially responsible for reimbursing a merchant receiving the coupon 102 for the purchase of a good or service. The sponsor, or its agent, is identified by way of information such as a logo and/or trademark. Each sponsor identifier (n) also identifies an identifier for an account from which to reimburse the merchant for the discount that the merchant gives to the consumer. The identifier for the account is encoded in the sponsor identifier (n) as shown on coupon 102 by way of visible indicia. This visual indicia can be optically scanned by an optical scanner in communication with the POS. A digital image of the coupon that is read by the optical scanner can be analyzed to derive therefrom an identifier for the sponsor's account. The identifier for the sponsor's account can be a Bank Identification Number (BIN), a code or alphanumeric sequence, or a Globally Unique IDentifer (GUID) to distinguish the account from other such accounts. The digital image that is read and analyzed for each identifier for each of the sponsor's accounts can be a barcode, as is shown on coupon 102 in FIG. 1.

Each Sponsor Account/GUID/Barcode #(n) can further encode a Globally Unique IDentifer (GUID) to distinguish the coupon from other coupons. From the coupon GUID (n), a predetermined set of conditions can be accessed and/or retrieved. The predetermined set of conditions can be used to dictate eligibility of the coupon for use in obtaining a discount or other term or condition for a purchase of a corresponding item in a transaction between a bearer of the coupon and a merchant. The predetermined set of conditions can be include: (i) a time within which the coupon is eligible for use to purchase the item; (ii) a geography within which the coupon is eligible for use to purchase the item; (iii) a jurisdiction within which the coupon is eligible for use to purchase the item; (iv) a set merchants from whom the coupon is eligible for the purchase of the item; (v) a quantity of the item for which the benefit(s) of the coupon are available to be applied; (vi) etc. The coupon GUID (n), can also be used to access and/or retrieve a stored prior usage counter for coupon and a predetermined maximum usage counter for the coupon. The later counter can be compared to the former to determine eligibility of the coupon for use to purchase the item. If eligible, the former counter can be maintained for a use of the coupon.

Coupon 102, as seen in FIG. 1, shows 'I' discounts for goods and services, where 'i' can be a large integer that ranges from 1 to the large integer. A merchant receiving coupon 102 from the consumer can give the consumer up to the 'I' discounts. The merchant can then be reimbursed from up to 'N' sponsor accounts, where 'n' can be a large integer that ranges from 1 to the large integer.

Coupon 102 can be delivered to the consumer via newspaper 104, or via a hard copy printed by a printer 106 upon demand by use of a computing apparatus 108 in communication with a database (not shown) containing data representing the coupon 102. Coupon 102 can also be received via mail delivery 118. By request from a mobile consumer telecommunication device, such as a Personal Digital Assistant (PDA) 110 or a cellular telephone 116, a soft copy of coupon 102 can be rendered on a display in communication with device 110, 116. By operation of a user interface of device 110, 116, the rendered image can be horizontally or vertically scrolled (112, 114) to show all rendered portions of the soft copy of coupon 102, for instance each barcode that is to be read by an optical scanner associated with a POS.

Coupon 102 is optically scanned by an optical scanner in communication with a POS. The digital image read by the optical scanner is analyzed to derived therefrom each barcode. Each barcode can then be further analyzed to determine an identifier encoded by the barcode. These identifiers can include: (i) those that identify a good or service; (ii) those that identify a discount to be given to the consumer who purchases the good or service from the merchant in compliance with the terms and conditions of the coupon; and (iii) those that identify an account from which the merchant is to be reimbursed in return for giving the discount to the consumer. The merchant uses the derived identifiers to be reimbursed for the discount(s) from the account(s) of the sponsor(s) via the processing of clearing and settlement incident to a reimbursement transaction through a payment processing system as will be describe below.

Figure 2:
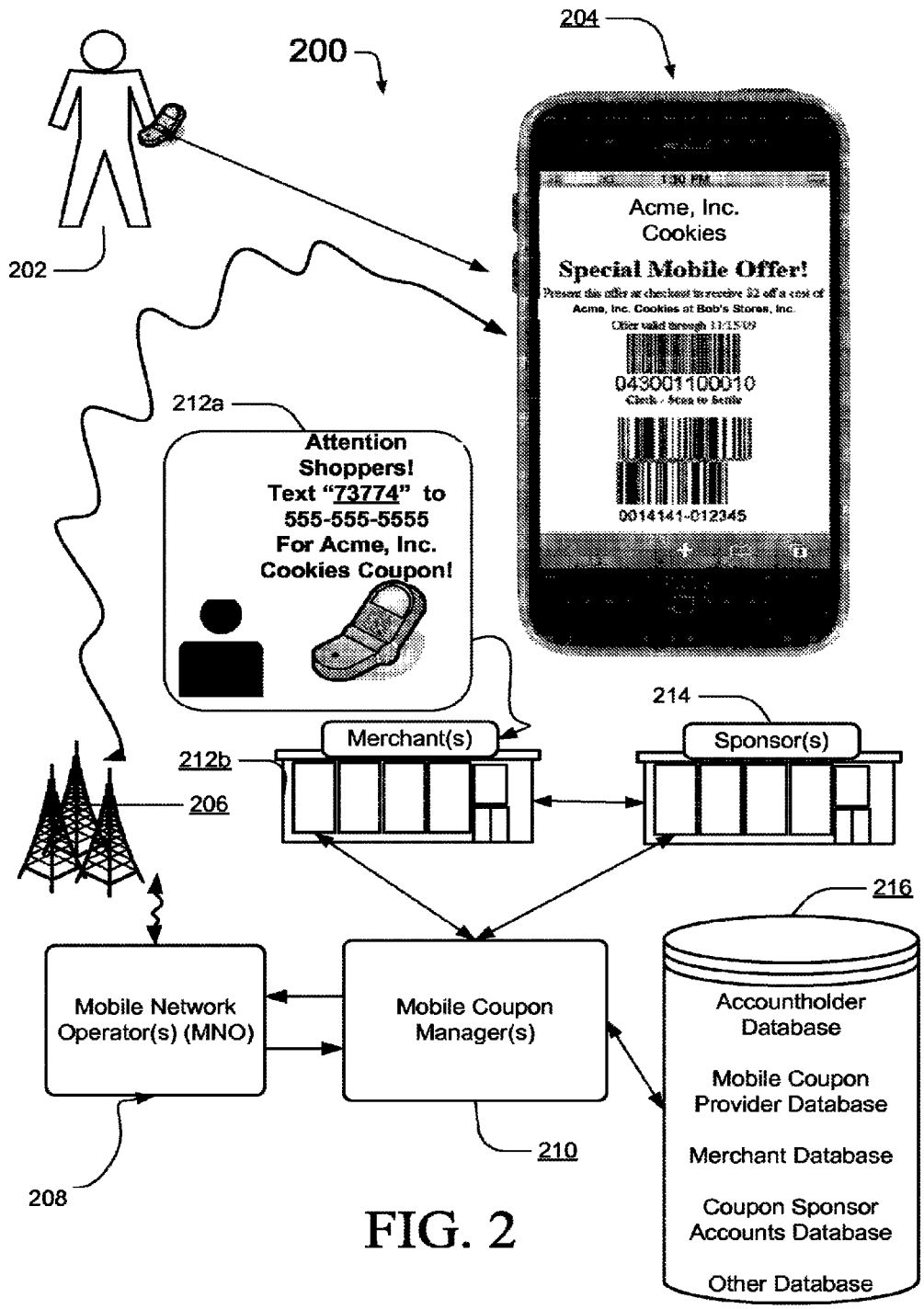
FIG. 2 illustrates an exemplary implementation of an electronic coupon and its mode of request and delivery to a consumer by use of a portable electronic communication device.

An environment 200 seen in FIG. 2 shows a consumer 202 using a mobile consumer telecommunication device, such as a Personal Digital Assistant (PDA) 204, which can be cellular telephone. Consumer 202 operates PDA 204 upon seeing a sign 212a in a store operated by a merchant 212b. Sign 212a makes an offer for an electronic coupon to consumer 202 in exchange for the consumer 202's action of using PDA 204 to send a text message to a specific address that includes the code "73774". Upon transmitting the requested text message from PDA 204, the transmission is communicated over cellular telephony paths that include apparatus and systems such as are seen at reference numeral 206, and/or local area network paths, so as to be received by a Mobile Network Operator(s) (MNO) 208.

MNO 208 communicates the request for the electronic coupon to a Mobile Coupon Manager 210. Mobile Coupon Manager 210 accesses network database device 216. Network database device 216 stores one or more databases, such as: (i) a database of account holders registered to received electronic coupons for delivery to a mobile device; (ii) a database of mobile coupon providers and electronic coupon content provided by same; (iii) a database of merchants participating in one or more mobile coupon campaigns; (iv) a database of accounts issued by issuers to sponsors who will reimburse merchants for accepting electronic coupons and giving corresponding discounts; (v) and other database(s) to facilitate content, control and delivery of electronic coupons as desired. Sponsor(s) 214, or their agents, to whom sponsor accounts are issued by issuers, can communicate with the mobile coupon manager and the merchant(s) 212b to facilitate content, control, delivery of electronic coupons, and reimbursement of the merchant(s) 2121b for the discounts given by same to consumers.

Mobile coupon manager 210 returns a response to the request for the electronic coupon for delivery to MNO 208, where the response can include information sufficient to render the requested electronic coupon on PDA 204. MNO 208 communicates the response to consumer 202, via a telecommunications path 206, for rendering on PDA 204.

The requested electronic coupon, as rendered on a display of PDA 204, includes a plurality of barcodes that can be read by an optical scanner in communication with merchant 212b's POS. Each barcode can encode various information. By way of example, but not by way of limitation, the encoded information in the barcodes can be include: (i) a product identifier for Acme, Inc. cookies being advertised by merchant 212b (Bob's Stores, Inc.) by way of sign 212a; (ii) a currency amount of the discount for purchase of the advertised Acme, Inc. cookies; (iii) one or more account identifiers corresponding to account(s) issued to sponsor(s) 214 from which merchant(s) 212b will be reimbursed for giving the discount to consumer 202 for purchasing the advertised Acme, Inc. cookies; and (iv) other information as desired.

Figure 5:
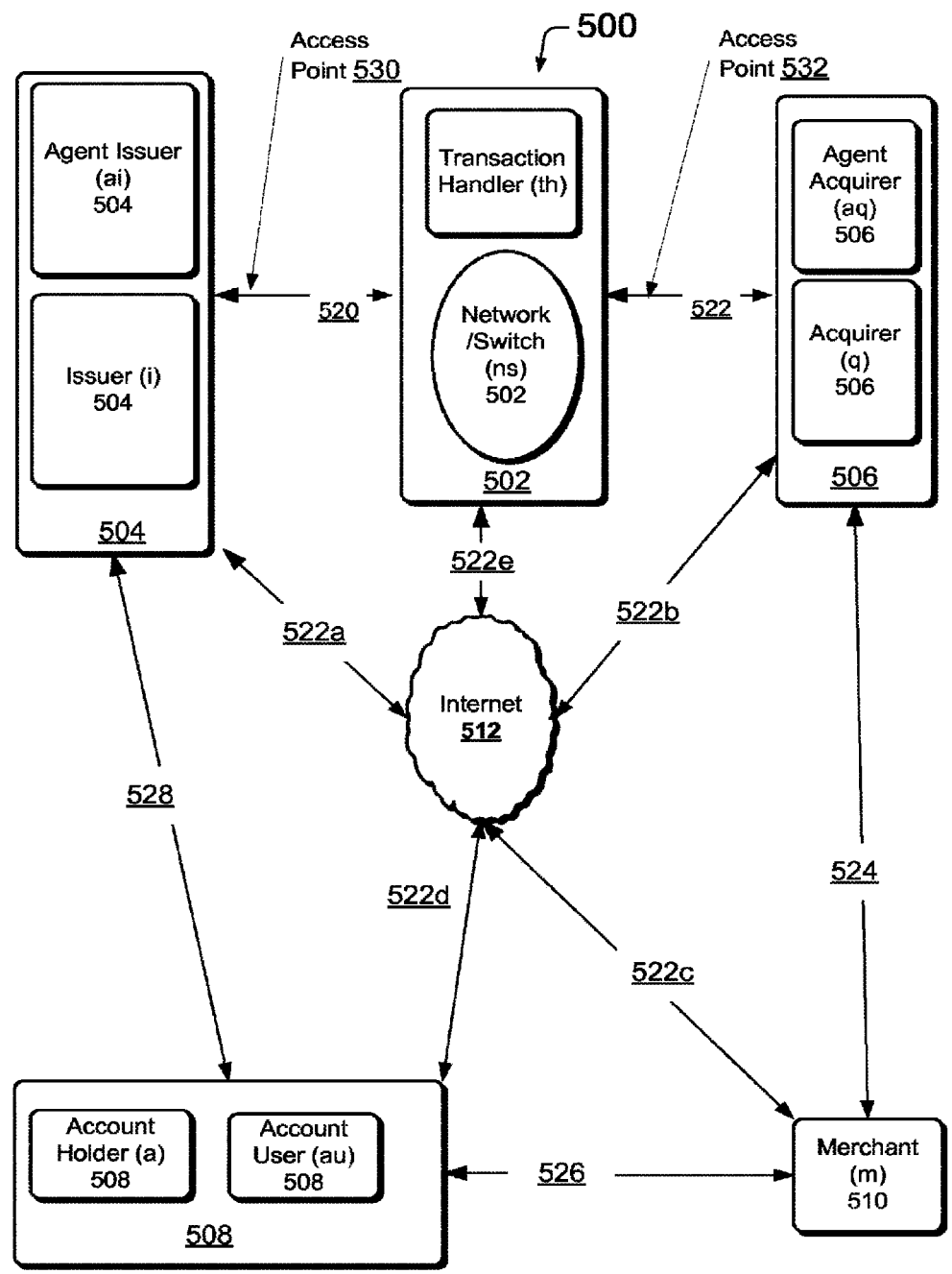
FIG. 5 illustrates an exemplary payment processing network.
Figure 6:
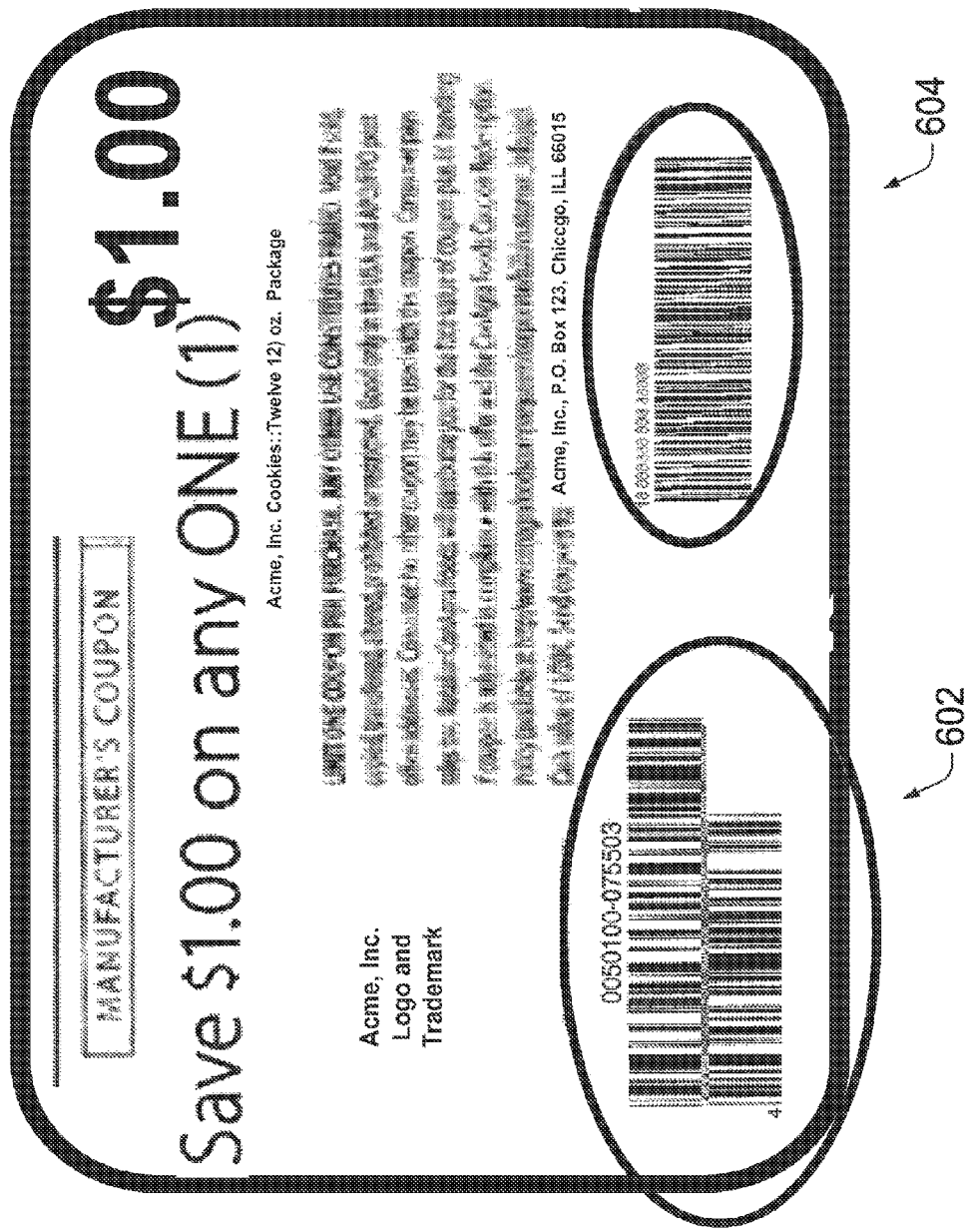
FIG. 6 illustrates alternative implementations of a coupon.

FIG. 6 shows yet another implementation of a coupon 602 that bears a visible barcode 604 that encodes an identifier for a sponsor account issued by an issuer in a payment processing system, such as is seen in FIG. 5 and described below. When a consumer uses coupon 600 to purchase "Acme, Inc. Cookies" in a twelve (12) oz. package, which is identified by data encoded in barcode 602, the consumer will receive a $1.00 US discount from a merchant. The merchant can then be reimbursed for the $1.00 US discount from the sponsor account by a clearing and settlement process through the payment processing system. Optionally, an authorization request, and a response thereto, to give the consumer the discount can also be routed by the merchant over the payment processing system between the merchant and the issuer of the sponsor's account.

Figure 3:
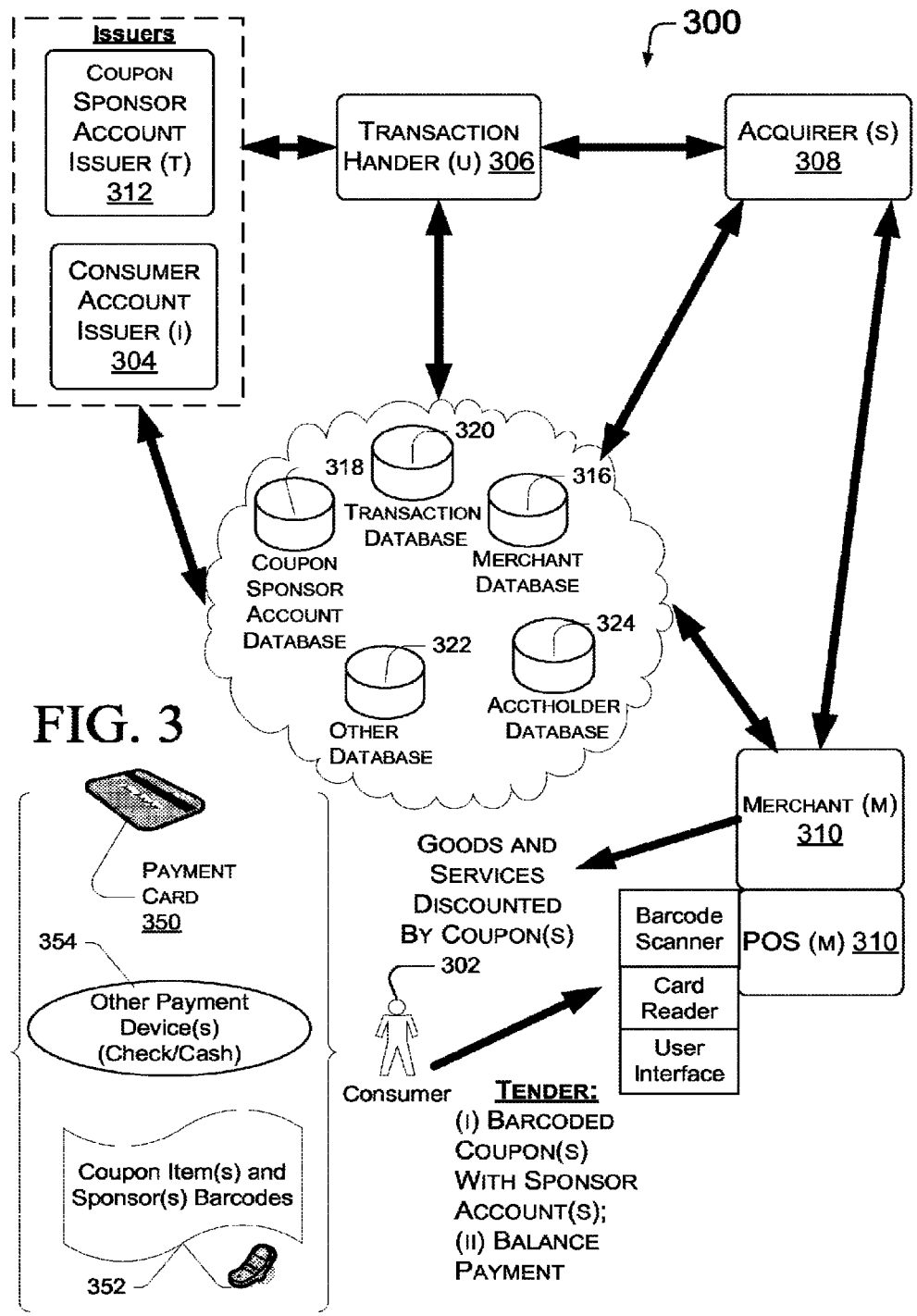
FIG. 3 depicts an environment, within an environment of a payment processing network seen in FIG. 5, where a coupon can be used by a consumer to obtain a discount on a good or service from a merchant who is reimbursed for the discount from an account that is visually identified on the coupon.

Within the exemplary payment processing system depicted in FIG. 5, discussed below, FIG. 3 illustrates an example of an environment in which a coupon 352 can be processed as described in connection with FIGS. 1-2, as it is used by a consumer 302 to obtain a discount for the purchase of a good or service from a merchant (m) 310 who has a Point of Service terminal (POS) (m) 310. The POS (m) 310 has an optical scanner, payment card reader, and user interface for performing transactions with consumers on accounts 304 issued to those consumers, and also for performing reimbursement transactions on coupon sponsor accounts 312 issued to sponsors of the coupons.

At POS (m) 310, consumer 302 presents to merchant (m) 310 a coupon 352, via soft or hard copy, along with the item(s) consumer 302 wishes to purchase. Merchant (m) 310 uses a barcode scanner that is associated with POS (m) 310 to read the barcode(s) on coupon 352, including the account identifier that is associated accounts 312 that have been issued to one or more sponsors of the coupon. In certain implementations, barcodes on coupon 352 are scanned by the optical scanner of POS (m) 310 to also obtain identifier(s) from good(s) and service(s) being purchased by consumer 302 from merchant (m) 310 at a discount.

In certain implementations, other information is also read by the optical scanner from coupon 352, such as, by way of example and not limitation, a coupon expiration date, a currency amount of the discount, a quantity of goods and services that are available for the corresponding discount(s), etc. In some implementations, POS (m) 310 may determine whether the coupon is valid for a good or service requested by consumer 302. This may occur, by way of example and not limitation, by comparing the current date with the expiration data of the coupon. Alternatively, POS (m) 310 may determine whether consumer 302 has requested the product or service in requisite quantities as required and specified by data on the coupon.

In certain implementations, merchant (m) 310 may additionally enter the full currency amount of the good(s) or service(s), before the discount(s), into POS (m) 310. In such implementations, the amount may also be visually displayed on coupon 352 (e.g.; as a maximum authorized amount). In other implementations, the amount is read via the optical scanner associated with POS (m) 310 from coupon 352 (e.g.; as a maximum authorized amount). In certain implementations, POS (m) 310 calculates the maximum authorized amount for the discount. This may occur, by way of example and not limitation, where the currency amount of the consumer 302's purchase exceeds the availability of the discount(s) and/or where the consumer 302 is also making other, non-discounted purchases from the merchant (m) 310.

Upon receipt of coupon 352, the transaction is processed similarly to a method described below in connection with an environment 500 depicted in FIG. 5. Merchant (m) 310 submits an authorization request to charge the discount amount of the coupon from a coupon sponsor account. Merchant (m) 310 sends the authorization request to acquirer (s) 308 via POS (m) 310. The authorization request will preferably include the account identifier for the sponsor account that was read from a barcode on coupon 352 by the optical scanner of the POS (m) 310.

In certain implementations, a second authorization request may additionally include an account identifier for an account issued to consumer 302 by a consumer account issuer (i) 304. In such an implementation, the consumer 302 will pay the currency amount of the transaction, less the discount(s), from the consumer's account(s) by use of the consumer's credit card, debit card, or other portable consumer payment device (e.g., as shown at reference number 350). Of course, consumer 302 can also use other forms of tender 354 to pay merchant (m) 310 for the currency amount of the transaction, less the discount(s).

Where acquirer (s) 308 is not the same entity as coupon sponsor account issuer (t) 312, acquirer (s) 308 forwards the transaction information for the coupon to a transaction handler (u) 306, who in turn forwards it to coupon sponsor account issuer (t) 312 to verify that the account associated with coupon sponsor account issuer (t) 312 contains sufficient funds and/or credit to reimburse merchant (m) 310 for the discount to be provided to the consumer 302. Of course, if the consumer 302 is also making other payments using other accounts, other authorization requests are send to the corresponding consumer account issuer (i) 304 of the consumer account.

Upon receipt of an authorization response to the authorization request from the coupon sponsor account issuer (t) 312, transaction handler (u) 306 forwards the authorization response to acquirer (s) 308, who forwards it to POS (m) 310 of merchant (m) 310. Where the authorization response contains an approval of the use of the coupon, consumer 302 can receive the discount on the purchase of the good or service from the merchant (m) 310 with the balance of the currency amount for the transaction being tendered (350, 354) by the consumer 302. The tender by the consumer can be in the form of cash or other negotiable currency, or can also be by offering to conduct the transaction upon: (i) a debit account issued by an issuer to the consumer or a party to whom the consumer is an agent; (ii) a credit account issued by an issuer to the consumer or a party to whom the consumer is an agent; (iii) a prepaid account issued by an issuer to the consumer or a party to whom the consumer is an agent; (iv) an Automated Clearing House (ACH) account issued by an issuer to the consumer or a party to whom the consumer is an agent; (v) a checking account issued by an issuer to the consumer or a party to whom the consumer is an agent; (vi) etc.

For multiple coupons used in a transaction, multiple sponsor account authorizations requests and corresponding sponsor account authorization responses will be respectively sent from and received by POS (m) 310 where multiple identifiers for multiple sponsor accounts are read by the optical scanner for one or more coupons. For the same transaction, multiple consumer account authorization requests and corresponding consumer account authorization responses will be respectively sent from and received by POS (m) 310 where multiple consumer accounts are used by the consumer to pay for the balance of the transaction less the discounts received for the multiple coupons.

In certain implementations, merchant (m) 310 invalidates or deletes the coupon 352 using POS (m) 310 once the discount has been applied. In certain implementations, coupon 352 may be a one-time use card. In such an implementation, Merchant (m) 310 may forgo returning coupon 352 to consumer 302. In other implementations, coupon 352 may be used to store subsequent other as-yet-unused discounts for other goods and services, and therefore coupon 353 will be returned to consumer 302 for such future use.

In certain implementations, approval of the transaction for the reimbursement of the merchant for the discount given to the consumer may be more involved. In such implementations, the authorization request includes additional information, by way of example and not limitation, the item, the item type, and/or the sponsor of the coupon. In certain implementations this information is forwarded by transaction handler (u) 306 to a third party (not shown) for authentication and/or other processing. In one implementation, one or more databases 316-324 may be accessed by one or more entities for use, by way of example and not limitation, to verify that coupon sponsor account issuer (t) 312 has issued the coupon 352 that the consumer 302 is attempting to use. In such an implementation, the authorization process may include a comparison, performed by the third party (not shown) of the additional information provided against information stored in one or more databases 316-324. In yet other implementations, a third party (not shown) adds a notation to an identifier for the coupon 352 stored in one or more databases 316-324 once it has been used by the consumer 202, thereby preventing its use more than a predetermined number of times. The third party (not shown) may have direct access to one or more of the databases 316-324 or may have such access via transaction handler (u) 306 or other entity seen in FIG. 3.

In other implementations, the third party (not shown), who may be an agent of the coupon sponsor, accesses and uses one or more databases 316-324 to keep a tally of the coupons used by consumers 302. In such an implementation, this information is used by coupon sponsor account issuer (t) 312 in deciding future coupons to issue or for identifying specific consumers 302 for targeted advertising. In still other implementations, the additional information includes an identifier for one or more advertisements that are to be, or were, presented to consumer 302 at the time that coupon 352 was used by the consumer 302. In such an implementation, after the information is stored in one or more databases 316-324 by the third party, coupon sponsor account issuer (t) 312 may charge another entity a fee for each time the advertisement is shown to the consumer 302. Alternatively, coupon sponsor account issuer (t) 312 may change the advertisement associated with an coupon 352 after the advertisement has been presented with the coupon 352 a given number of times.

In other implementations, one or more databases 316-324 may contain information regarding the account issued to each coupon sponsor account issuer (t) 312, where coupon sponsor account issuer (t) 312 is one of the coupon sponsors. In such implementations, the third party (not shown) uses one or more databases 316-324 to verify that the account identifier read from coupon 352 is associated with one of the coupon sponsors. The one or more databases 316-324 may additionally be used to verify that the associated account contains funds sufficient to reimburse merchant (m) 310 for the discount applied. In certain implementations, the aforementioned third party (not shown) is the same entity as transaction handler (u) 306. In other implementations, the aforementioned third party (not shown) is a separate entity from transaction handler (u) 306.

When merchant (m) 310 submits the discount reimbursement transaction to a payment processing system 300 via POS (m) 310 for clearing and settlement, the account of coupon sponsor account issuer (t) 312 is debited (e.g.; decreased) for the currency amount of the discount. Specifically, merchant (m) 310 submits a request for payment to acquirer (s) 308. Where acquirer (s) 308 is not the same entity as coupon sponsor account issuer (t) 312, acquirer (s) 308 forwards the request to transaction handler (u) 306. Transaction handler (u) 306 in turn requests payment for the discount from coupon sponsor account issuer (t) 312, where coupon sponsor account issuer (t) 312 is the issuer of the account associated with the sponsor of the discount on the coupon. Coupon sponsor account issuer (t) 312 debits (decreases) the currency in the account and forward the payment to transaction handler (u) 306 who forwards the payment to acquirer (s) 308. Finally, acquirer (s) 308 credits (increases) the account of merchant (m) 310 with the currency amount of the discount provided to consumer 302.

In certain implementations, the clearing and settlement process may involve a third party (not shown). In such an implementation, the third party may, by way of example and not limitation, record each coupon 352 that has been cleared and settled. This data may be kept in one or more databases 316-324. Alternatively or in addition thereto, the third party may verify that the coupon 352 was used in the transaction being cleared and settled. In yet other implementations, the third party may determine the account associated with a sponsor of the discount on the coupon in order that transaction handler (u) 306 may request coupon sponsor account issuer (t) 312 to debit (decrease) the currency in the corresponding account of the sponsor. In such implementations, the third party may access one or more databases 316-324.

As will be understood by a person of ordinary skill in the relevant arts, the process described in connection with FIG. 3 is equally applicable to the situation where a consumer uses a coupon having multiple discounts and corresponding sponsor accounts stored thereon by way of barcode encoding (or other symbology) such that the coupon is not a single use coupon but rather can be used for receiving a plurality of discounts on a plurality of different goods and services (e.g.; one or more discounts for each of several chronological purchases of one or more goods and/or services up to a predetermined number of discounts). In such a situation, the coupon may be a collaboration of different coupon sponsors each having a coupon reimbursement account issued by a different issuer. For example, coupon 352 may show bar-coding that identifies one or more sponsor accounts which, in dealing with the respective issuer thereof, will attribute the discounts according to a predetermined collaborative agreements among the sponsors. Further, it will be clear to a person of ordinary skill in the relevant arts that a coupon may have multiple different types of discounts for goods and services encoded via bar-coding on a surface thereof, where each coupon is valid only at respectively different merchants, each having a different acquirer.

Figure 4:
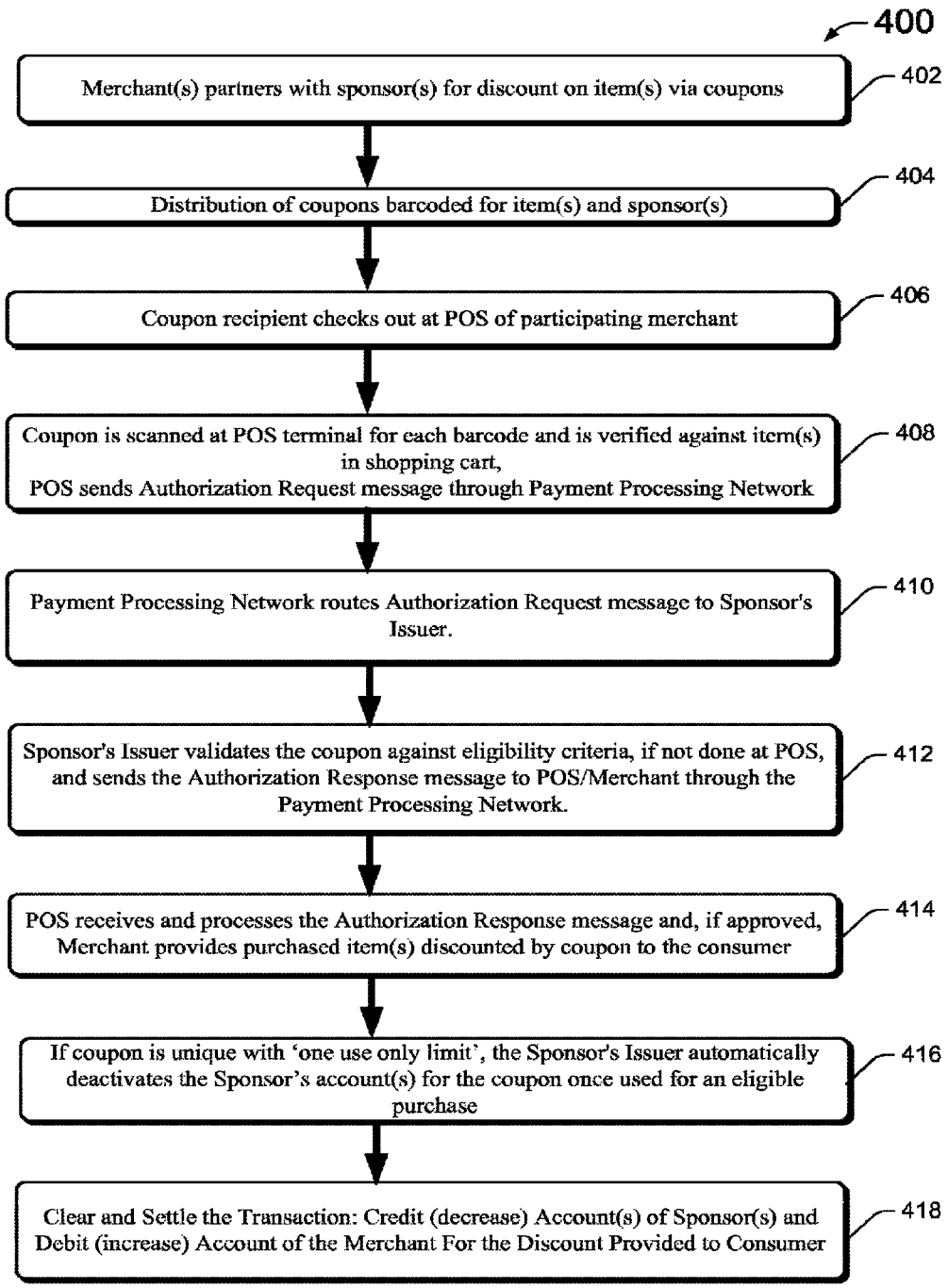
FIG. 4 depicts a flow chart of an exemplary method in which a coupon can be used at a merchant's Point of Service terminal (POS) by a consumer to obtain a discount from the merchant on a purchase of a good or service, where the merchant will be reimbursed for the discount from an account identified from data read from a surface of the coupon by an optical scanner in communication with the POS.

Turning now to FIG. 4, a flow chart of an exemplary method 400 is shown. As indicated by block 402, an issuer would partner with retailers, manufacturers, wholesalers, non-profits, and/or government agencies to issue a coupon, where each partner would sponsor the cost of the discount. The coupon would be used by consumers to obtain the discount on a good or service identified by the coupon from a participating merchant. The coupon bears one or more barcodes on a surface thereof, each of which can be read by an optical scanner. One such barcode encodes an identifier for an account issued to the sponsor from which the merchant will be reimbursed for the discount given to the consumer who uses the coupon to buy the good or service.

At block 404, there is a distribution to consumers of the coupons that have been bar-coded for item(s) and sponsor(s), for example, as shown in FIGS. 1-2. At block 408, a consumer goes to a merchant, selects the good or service being discounted by a coupon, and presents the coupon at the merchant's Point of Service terminal (POS) along with the items in the coupon that are in the consumer's shopping cart. The coupon is optically scanned at the POS for each barcode on the coupon. Image(s) retrieved from the optical scan can be digitized to derive therefrom information sufficient to identify, for an item being purchased by the consumer in the transaction with the merchant: (i) one or more sponsor accounts issued by an issuer to a sponsor of a discount corresponding to the coupon; and (ii) a Globally Unique IDentifier (GUID) for the coupon. A computerized verification can be made at the POS of items identified by the coupon(s) and respective item(s) in the shopping cart so as to be compliant with terms and conditions of the coupon(s).

The POS sends an Authorization Request message through a Payment Processing Network, such as is seen in FIG. 5. At block 410, the Payment Processing Network routes the Authorization Request message to the Sponsor's Issuer. At block 412, the sponsor's issuer for the account identified on the coupon validates the coupon against eligibility criteria, if not done at POS, or for other validity against criteria not validated at the POS. The Sponsor's issuer sends an Authorization Response message to the POS at the merchant through the Payment Processing Network.

The validation of the coupon pertaining to an item being purchased against eligibility criteria can include retrieval and/or access to a predetermined set of conditions for use of the coupon for a purchase of the item in a transaction between a consumer bearing the coupon and a merchant. The predetermined set of conditions can include comparisons of data pertaining the coupon and the transaction between the consumer and the merchant. These comparisons can includes: (i) a time within which the coupon is eligible for use to purchase the item; (ii) a geography within which the coupon is eligible for use to purchase the item; (iii) a jurisdiction within which the coupon is eligible for use to purchase the item; (iv) a set of particular merchants from whom the coupon is eligible for use for the purchase of the item; (v) etc. Also, or in the alternative, a currency available balance of the sponsor account(s) can be accessed and retrieved in order to determine, in real time at the POS, adequacy of funds on deposit sufficient to extend the discount to the bearer of the respective coupon(s).

At block 414, the POS receives and processes the Authorization Response message, and if approved, the merchant provides the purchased item(s) as discounted by the coupon amount(s) to the consumer in exchange for the consumer's tender to the merchant of the full currency amount for the transaction less the discount(s). At block 416, if the coupon has been determined to be unique (i.e.; a 'one-use-only limit type coupon'), the sponsor's issuer may automatically deactivate the sponsor's account(s) for a Globally Unique IDentifier (GUID) that is associated with that particular coupon once it has been used for an eligible purchase (e.g.; such as by access to, and maintenance of, of the GUID stored in one or more databases 316-324 seen in FIG. 3).

At block 418, the merchant can, in some implementations, automatically receive payment for its discount given for the consumer's purchase, along with all other payment processing network transactions (e.g.; via clearing and settlement). In a clearing and settling of the transaction for the discount, there will be a credit (decrease) of an account of a sponsor of a coupon and a corresponding debit (increase) of an account of the merchant.

In some implementation, a coupon can be associated with a sponsor's account number that has a Bank Identification Number (BIN) that corresponds to a particular transaction handler (e.g., by Visa Inc., American Express, MasterCard, or other transaction handler). For instance, the coupon sponsor's account number can begin with the digit '4'. In other implementations, the coupon can have a form factor of a physical plastic card design that may contain a bar code that conveys identifiers for: (i) the discount in a currency amount; (ii) the discounted product or service; (iii) a merchant offering the discount; (iv) the quantity of the good or service for which the discount can be applied; (v) an expiration date for the coupon; (vi) etc. In other implementations, the discount would not be permitted to be combined, by the merchant, with the purchase of any other good or service. In still other implementations, a private label service for a payment processing network could be used, such as for the discount sponsor's issuer or for a specific transaction handler (i.e.; VisaNet® network operated by Visa Inc.) who validates that: (i) the coupon is being redeemed from an authorized or participating location and/or merchant (i.e.; merchant); (ii) the sponsor's funds have been set aside with the sponsor's issuer for the discount that has not yet been redeemed; and (iii) the coupon is still valid at the time of its use by the bearer. The payment processing network clearing and settlement system can be used to move funds between the respective accounts of the coupon sponsor funding party and the party to whom the discount is to be redeemed (e.g.; the merchant and/or location thereof, who gave both the discount and the good or service to the consumer).

Examples of payment processing networks contemplated for use of various implementations disclosed herein include: MasterCard, AMEX, Discover, JCB, STAR, NYCE, Pulse, Accel, AFFN, CU24, Maestro, Interlink, Shazam, and Automated Clearing House (ACH) in addition to payment networks that may settle through the ACH such as PayPal.

In certain implementations, individual blocks described above for FIG. 4 may be combined, eliminated, or reordered. Also, in certain implementations, instructions (e.g.; software) are encoded in non-transient computer readable medium wherein those instructions are executed by computing apparatus (e.g.; hardware) processor to perform one or more of the blocks for FIG. 4. In yet other implementations, instructions reside in any other computer program product, where those instructions are executed by a computer external to, or internal to, a computing system to perform one or more of the blocks of FIG. 4. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compact flash, smart media, and the like.

An Exemplary Transaction Processing System/Payment Processing Network

Referring to FIG. 5, a transaction processing system 500 is seen to as an environment in which method 400 in FIG. 4 can be performed, and as a general example for payment processing system 300 in FIG. 3. The general environment of FIG. 5 include that of a merchant (m) 510, such as the merchant, who can conduct a transaction for goods and/or services with an account user (au) (e.g., consumer) on an account issued to an account holder (a) 508 by an issuer (i) 504, where the processes of paying and being paid for the transaction are coordinated by at least one transaction handler (th) 502 (e.g., the transaction handler) (collectively "users"). The transaction includes participation from different entities that are each a component of the transaction processing system 500.

The transaction processing system 500 may have at least one of a plurality of transaction handlers (th) 502 that includes transaction handler (1) 502 through transaction handler (TH) 502, where TH can be up to and greater than an eight digit integer.

The transaction processing system 500 has a plurality of merchants (m) 510 that includes merchant (1) 510 through merchant (M) 510, where M can be up to and greater than an eight digit integer. Merchant (m) 510 may be a person or entity that sells goods and/or services. Merchant (m) 510 may also be, for instance, a merchant who can administer a controlled substance (e.g.; a drug) to a consumer in the form of a discount, such as flu shot or a nasal inhalation procedure. In a business-to-business setting, the account holder (a) 508 may be a second merchant (m) 510 making a purchase from another merchant (m) 510.

Transaction processing system 500 includes account user (1) 508 through account user (AU) 508, where AU can be as large as a ten digit integer or larger. Each account user (au) conducts a transaction with merchant (m) 510 for goods and/or services using the account that has been issued by an issuer (i) 504 to a corresponding account holder (a) 508. Data from the transaction on the account is collected by the merchant (m) 510 and forwarded to a corresponding acquirer (a) 506. Acquirer (a) 506 forwards the data to transaction handler (th) 502 who facilitates payment for the transaction from the account issued by the issuer (i) 504 to account holder (a) 508.

Transaction processing system 500 has a plurality of acquirers (q) 506. Each acquirer (q) 506 may be assisted in processing one or more transactions by a corresponding agent acquirer (aq) 506, where 'q' can be an integer from 1 to Q, where aq can be an integer from 1 to AQ, and where Q and AQ can be as large as a eight digit integer or larger. Each acquirer (q) 506 may be assisted in processing one or more transactions by a corresponding agent acquirer (aq) 506, where 'q' can be an integer from 1 to Q, where aq can be an integer from 1 to AQ, and where Q and AQ can be as large as a eight digit integer or larger.

The transaction handler (th) 502 may process a plurality of transactions within the transaction processing system 500. The transaction handler (th) 502 can include one or a plurality or networks and switches (ns) 502. Each network/switch (ns) 502 can be a mainframe computer in a geographic location different than each other network/switch (ns) 502, where 'ns' is an integer from one to NS, and where NS can be as large as a four digit integer or larger.

Dedicated communication systems 520, 522 (e.g., private communication network(s)) facilitate communication between the transaction handler (th) 502 and each issuer (i) 504 and each acquirer (a) 506. A Network 512, via e-mail, the World Wide Web, cellular telephony, and/or other optionally public and private communications systems, can facilitate communications 522*a*-622*e* among and between each issuer (i) 504, each acquirer (a) 506, each merchant (m) 510, each account holder (a) 508, and the transaction handler (th) 502. Alternatively and optionally, one or more dedicated communication systems 524, 526, and 528 can facilitate respective communications between each acquirer (a) 506 and each merchant (m) 510, each merchant (m) and each account holder (a) 508, and each account holder (a) 508 and each issuer (i) 504, respectively.

The Network 512 may represent any of a variety of suitable means for exchanging data, such as: an Internet, an intranet, an extranet, a wide area network (WAN), a local area network (LAN), a virtual private network, a satellite communications network, an Automatic Teller Machine (ATM) network, an interactive television network, or any combination of the forgoing. Network 512 may contain either or both wired and wireless connections for the transmission of signals including electrical, magnetic, and a combination thereof. Examples of such connections are known in the art and include: radio frequency connections, optical connections, etc. To illustrate, the connection for the transmission of signals may be a telephone link, a Digital Subscriber Line, or cable link. Moreover, network 512 may utilize any of a variety of communication protocols, such as Transmission Control Protocol/Internet Protocol (TCP/IP), for example. There may be multiple nodes within the network 512, each of which may conduct some level of processing on the data transmitted within the transaction processing system 500.

Users of the transaction processing system 500 may interact with one another or receive data about one another within the transaction processing system 500 using any of a variety of communication devices. The communication device may have a processing unit operatively connected to a display and memory such as Random Access Memory (RAM) and/or Read-Only Memory (ROM). The communication device may be combination of hardware and software that enables an input device such as a keyboard, a mouse, a stylus and touch screen, or the like.

For example, use of the transaction processing system 500 by the account holder (a) 508 may include the use of a portable consumer device (PCD). The PCD may be one of the communication devices, or may be used in conjunction with, or as part of, the communication device. The PCD may be in a form factor that can be: a card (e.g., bank card, payment card, financial card, credit card, charge card, debit card, gift card, transit pass, smart card, access card, a payroll card, security card, healthcare card, or telephone card), a tag, a wristwatch, wrist band, a key ring, a fob (e.g., SPEEDPASS® commercially available from ExxonMobil Corporation), a machine readable medium containing account information, a pager, a cellular telephone, a personal digital assistant, a digital audio player, a computer (e.g., laptop computer), a set-top box, a portable workstation, a minicomputer, or a combination thereof. The PCD may have near field or far field communication capabilities (e.g., satellite communication or communication to cell sites of a cellular network) for telephony or data transfer such as communication with a global positioning system (GPS). The PCD may support a number of services such as SMS for text messaging and Multimedia Messaging Service (MMS) for transfer of photographs and videos, electronic mail (email) access.

The PCD may include a computer readable medium. The computer readable medium, such as a magnetic stripe or a memory of a chip or a chipset, may include a volatile, a non-volatile, a read only, or a programmable memory that stores data, such as an account identifier, a consumer identifier, and/or an expiration date. The computer readable medium may including executable instructions that, when executed by a computer, the computer will perform a method. For example, the computer readable memory may include information such as the account number or an account holder (a) 508's name.

Examples of the PCD with memory and executable instructions include: a smart card, a personal digital assistant, a digital audio player, a cellular telephone, a personal computer, or a combination thereof. To illustrate, the PCD may be a financial card that can be used by a consumer to conduct a contactless transaction with a merchant, where the financial card includes a microprocessor, a programmable memory, and a transponder (e.g., transmitter or receiver). The financial card can have near field communication capabilities, such as by one or more radio frequency communications such as are used in a "Blue Tooth" communication wireless protocol for exchanging data over short distances from fixed and mobile devices, thereby creating personal area networks.

Merchant (m) 510 may utilize at least one POI terminal (e.g., Point of Service or browser enabled consumer cellular telephone); that can communicate with the account user (au) 508, the acquirer (a) 506, the transaction handler (th) 502, or the issuer (i) 504. A Point of Interaction (POI) can be a physical or virtual communication vehicle that provides the opportunity, through any channel to engage with the consumer for the purposes of providing content, messaging or other communication, related directly or indirectly to the facilitation or execution of a transaction between the merchant (m) 510 and the consumer. Examples of the POI include: a physical or virtual Point of Service (POS) terminal, the PCD of the consumer, a portable digital assistant, a cellular telephone, paper mail, e-mail, an Internet website rendered via a browser executing on computing device, or a combination of the forgoing. Thus, the POI terminal is in operative communication with the transaction processing system 500.

The PCD may interface with the POI using a mechanism including any suitable electrical, magnetic, or optical interfacing system such as a contactless system using radio frequency, a magnetic field recognition system, or a contact system such as a magnetic stripe reader. To illustrate, the POI may have a magnetic stripe reader that makes contact with the magnetic stripe of a debit card, a credit card, or a healthcare card (e.g., Flexible Savings Account card) of the consumer. As such, data encoded in the magnetic stripe on the consumer's card is read and passed to the POI at merchant (m) 510. These data can include an account identifier for an account issued to the consumer by an issuer. In another example, the POI may be the PCD of the consumer, such as the cellular telephone of the consumer, where the merchant (m) 510, or an agent thereof, receives the account identifier of the consumer via a webpage of an interactive website rendered by a browser executing on a World Wide Web (Web) enabled PCD.

Typically, a transaction begins with account user (au) 508 presenting the portable consumer device to the merchant (m) 510 to initiate an exchange for resources (e.g., a good or service). The portable consumer device may be associated with an account (e.g., a credit account) of account holder (a) 508 that was issued to the account holder (a) 508 by issuer (i) 504.

Merchant (m) 510 may use the POI terminal to obtain account information, such as a number of the account of the account holder (a) 508, from the portable consumer device. The portable consumer device may interface with the POI terminal using a mechanism including any suitable electrical, magnetic, or optical interfacing system such as a contactless system using radio frequency or magnetic field recognition system or contact system such as a magnetic stripe reader. The POI terminal sends a transaction authorization request to the issuer (i) 504 of the account associated with the PCD. Alternatively, or in combination, the PCD may communicate with issuer (i) 504, transaction handler (th) 502, or acquirer (a) 506.

Issuer (i) 504 may authorize the transaction and forward same to the transaction handler (th) 502. Transaction handler (th) 502 may also clear the transaction. Authorization includes issuer (i) 504, or transaction handler (th) 502 on behalf of issuer (i) 504, authorizing the transaction in connection with issuer (i) 504's instructions such as through the use of business rules. The business rules could include instructions or guidelines from the transaction handler (th) 502, the account holder (a) 508, the merchant (m) 510, the acquirer (a) 506, the issuer (i) 504, a related financial institution, or combinations thereof. The transaction handler (th) 502 may, but need not, maintain a log or history of authorized transactions. Once approved, the merchant (m) 510 may record the authorization, allowing the account user (au) 508 to receive the good or service from merchant (m) or an agent thereof.

The merchant (m) 510 may, at discrete periods, such as the end of the day, submit a list of authorized transactions to the acquirer (a) 506 or other transaction related data for processing through the transaction processing system 500. The transaction handler (th) 502 may optionally compare the submitted authorized transaction list with its own log of authorized transactions. The transaction handler (th) 502 may route authorization transaction amount requests from the corresponding the acquirer (a) 506 to the corresponding issuer (i) 504 involved in each transaction. Once the acquirer (a) 506 receives the payment of the authorized transaction from the issuer (i) 504, the acquirer (a) 506 can forward the payment to the merchant (m) 510 less any transaction costs, such as fees for the processing of the transaction. If the transaction involves a debit or pre-paid card, the acquirer (a) 506 may choose not to wait for the issuer (i) 504 to forward the payment prior to paying merchant (m) 510.

There may be intermittent steps in the foregoing process, some of which may occur simultaneously. For example, the acquirer (a) 506 can initiate the clearing and settling process, which can result in payment to the acquirer (a) 506 for the amount of the transaction. The acquirer (a) 506 may request from the transaction handler (th) 502 that the transaction be cleared and settled. Clearing includes the exchange of financial information between the issuer (i) 504 and the acquirer (a) 506 and settlement includes the exchange of funds. The transaction handler (th) 502 can provide services in connection with settlement of the transaction. The settlement of a transaction includes depositing an amount of the transaction settlement from a settlement house, such as a settlement bank, which transaction handler (th) 502 typically chooses, into a clearinghouse bank, such as a clearing bank, that acquirer (a) 506 typically chooses. The issuer (i) 504 deposits the same from a clearinghouse bank, such as a clearing bank, which the issuer (i) 504 typically chooses, into the settlement house. Thus, a typical transaction involves various entities to request, authorize, and fulfill processing the transaction.

The transaction processing system 500 will preferably have network components suitable for scaling the number and data payload size of transactions that can be authorized, cleared and settled in both real time and batch processing. These include hardware, software, data elements, and storage network devices for the same. Examples of transaction processing system 500 include those operated, at least in part, by: American Express Travel Related Services Company, Inc; MasterCard International, Inc.; Discover Financial Services, Inc.; First Data Corporation; Diners Club International, LTD; Visa Inc.; and agents of the foregoing.

Each of the network/switch (ns) 502 can include one or more data centers for processing transactions, where each transaction can include up to 100 kilobytes of data or more. The data corresponding to the transaction can include information about the types and quantities of goods and services in the transaction, information about the account holder (a) 508, the account user (au) 508, the merchant (m) 510, tax and incentive treatment(s) of the goods and services, coupons, rebates, rewards, loyalty, discounts, returns, exchanges, cashback transactions, etc.

By way of example, network/switch (ns) 502 can include one or more mainframe computers (e.g., one or more IBM mainframe computers) for one or more server farms (e.g., one or more Sun UNIX Super servers), where the mainframe computers and server farms can be in diverse geographic locations.

Each issuer (i) 504 (or agent issuer (ai) 504 thereof) and each acquirer (a) 506 (or agent acquirer (aq) 506 thereof) can use or more router/switch (e.g., Cisco™ routers/switches) to communicate with each network/switch (ns) 502 via dedicated communication systems.

Transaction handler (th) 502 can store information about transactions processed through transaction processing system 500 in data warehouses such as may be incorporated as part of the plurality of networks/switches 502. This information can be data mined. The data mining transaction research and modeling can be used for advertising, account holder and merchant loyalty incentives and rewards, fraud detection and prediction, and to develop tools to demonstrate savings and efficiencies made possible by use of the transaction processing system 500 over paying and being paid by cash, or other traditional payment mechanisms.

FIG. 5 includes transaction handler 502 communicating through access points 530, 532 with acquirers 506, and issuers 504. Other entities such as drawee banks and third party authorizing agents may also connect to the network through access points 530, 532. Access points 530, 532 are typically made up of small computer systems located at a processing center that interfaces between the center's host computer and an interchange center. The access point facilitates the transmission of messages and files between the host and the interchange center supporting the authorization, clearing and settlement of transaction. Telecommunication links between the acquirer (q) 506 and its access point 532, and between the access point 530 and issuer (i) 504, are typically local links within a center and use a proprietary message format as preferred by the center.

As mentioned above, access points 530, 532 are typically located at a data processing center that interfaces between the data processing center's host computer and an interchange center. The interchange center is a data processing center that may be located anywhere in the world. In one implementation, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferable, the communication lines that connect an interchange center (Transaction Handler 502) to remote entities use dedicated high-bandwidth telephone circuits or satellite connections based on the IBM SNA-LU0 communication protocol. Messages are sent over these lines using any suitable implementation of the ISO 8583 standard.

A data processing center (such as is located within an acquirer, issuer, or other entity) houses processing systems that support merchant and business locations and maintains customer data and billing systems. Preferably, each data processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

The VisaNet® system is an example component of the transaction handler (th) 502 in the transaction processing system 500. Presently, the VisaNet® system is operated in part by Visa Inc. As of 2006, the VisaNet® system Inc. was processing around 300 million transaction daily, on over 1 billion accounts used in over 170 countries. Financial institutions numbering over 16,000 connected through the VisaNet® system to around 30 million merchants 510. In 2007, around 81 billion transactions for about 4 trillion U.S. dollars were cleared and settled through the VisaNet® system, some of which involved a communication length of around 24,000 miles in around two (2) seconds and during which a plurality of stops are made for processing data in the transaction.

The steps, methods, processes, and devices described in connection with the implementations disclosed herein, are made with reference to the Figures, in which like numerals represent the same or similar elements. While described in terms of the best mode, it will be appreciated by those skilled in the art that the description is intended to cover alternatives, modifications, and equivalents as may be included within the spirit and scope of the invention as defined by the appended claims and their equivalents as supported by the following disclosure and drawings. Reference throughout this specification to "one implementation," "an implementation," or similar language means that a particular feature, structure, or characteristic described in connection with the implementation is included in at least one implementation of the present invention. Thus, appearances of the phrases "in one implementation," "in an implementation," and similar language throughout this specification may, but do not necessarily, all refer to the same implementation.

The described features, structures, or characteristics of the invention may be combined in any suitable manner in one or more implementations. In the following description, numerous specific details are recited to provide a thorough understanding of implementations of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one implementation of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving, by a computing device, a coupon authorization request message from a merchant that identifies a sponsor account;

sending, by the computing device, the coupon authorization request message to an issuer of the sponsor account;

receiving, by the computing device in response to the coupon authorization request message, a coupon authorization response message;

receiving, by the computing device, a consumer authorization request message from the merchant identifying a consumer account;

sending, by the computing device, the consumer authorization request message to an issuer of the consumer account;

receiving, by the computing device in response to the consumer authorization request message, a consumer authorization response message from the issuer of the consumer account; and sending, by the computing device, the consumer authorization response message to the merchant.

2. The method, as defined in claim 1, wherein the issuer of the sponsor account and the issuer of the consumer account are different issuers.

3. The method, as defined in claim 1, further comprising:

receiving, by the computing device, a plurality of said coupon authorization request messages each originating from the merchant, wherein each said coupon authorization request message identifies one said sponsor account and one said coupon for an item being purchased by the consumer in a transaction with the merchant; and for each said coupon authorization request message, and prior to the receiving of the consumer authorization request message:

sending, by the computing device, the coupon authorization request message to an issuer of the corresponding one said sponsor account;

receiving, by the computing device and in response to the coupon authorization request message, a coupon authorization response message from the issuer of the one said sponsor account, wherein the coupon authorization response message includes eligibility of the coupon for use by the consumer for the purchase of the item in the transaction with the merchant; and sending, by the computing device, the coupon authorization response message the merchant.

4. A non-transitory computer readable storage medium storing instructions executable by a computing device to perform operations comprising:

receiving, by the computing device, a coupon authorization request message from a merchant that identifies a sponsor account;

sending, by the computing device, the coupon authorization request message to an issuer of the sponsor account;

receiving, by the computing device in response to the coupon authorization request message, a coupon authorization response message;

receiving, by the computing device, a consumer authorization request message from the merchant identifying a consumer account;

sending, by the computing device, the consumer authorization request message to an issuer of the consumer account;

receiving, by the computing device in response to the consumer authorization request message, a consumer authorization response message from the issuer of the consumer account; and sending, by the computing device, the consumer authorization response message to the merchant.

5. A method comprising:

receiving, by a computing device, an authorization request message from a merchant, wherein the authorization request message includes information to identify a sponsor account and a coupon;

retrieving, by the computing device and using the information in the authorization request message, coupon eligibility data pertaining to the sponsor account and the coupon;

determining, by the computing device and using the coupon eligibility data, eligibility of the coupon; and sending, by the computing device and in response to the authorization request message, an authorization response message to the merchant, wherein the authorization response message includes an identifier corresponding to eligibility of the coupon.

6. The method, as defined in claim 5, wherein the retrieved coupon eligibility data is sufficient for the determining of whether:

the time of a transaction is within a predetermined time within which the coupon is eligible for use to purchase an item;

a location within which the transaction is taking place is within a predetermined geography within which the coupon is eligible for use to purchase the item; and the merchant is with a predetermined set of said merchants from whom the coupon is eligible for the purchase of the item.

7. The method as defined in claim 5, wherein the item is being purchased by a consumer in a transaction for a transaction currency amount less a discount currency amount corresponding to the coupon.

8. The method as defined in claim 7, wherein the transaction currency amount less the discount currency amount payable to the merchant by the consumer is not paid from a balance of currency in the sponsor account.

9. The method as defined in claim 5, wherein a transaction is being conducted on a consumer account that is not the sponsor account.

10. The method as defined in claim 9, wherein the consumer account is one selected from the group consisting of:

a debit account issued by an issuer to the consumer;

a credit account issued by an issuer to the consumer;

a prepaid account issued by an issuer to the consumer;

an Automated Clearing House (ACH) account issued by an issuer to the consumer; and a checking account issued by an issuer to the consumer.

11. A method comprising:

receiving, by a computing device, an authorization request message originating from a merchant, wherein the authorization request message includes information to identify:

the sponsor account; and a Globally Unique IDentifier (GUID) for a coupon for an item being purchased by the consumer in the transaction with the merchant;

retrieving, by the computing device and using the information in the authorization request message:

a predetermined set of conditions for use of the coupon for the purchase of the item in the transaction with the merchant; and a currency available balance of the sponsor account;

determining, by the computing device, eligibility of the coupon for use by the consumer for the purchase of the item in the transaction with the merchant; and sending, by the computing device and in response to the authorization request message, an authorization response message, wherein the authorization response message includes an identifier corresponding to eligibility of the coupon for use by the consumer for the purchase of the item in the transaction with the merchant.

12. The method, as defined in claim 11, wherein the predetermined set of conditions for use of the coupon for the purchase of the item in the transaction is one selected from the group consisting of:
- a time within which the coupon is eligible for use to purchase the item;
- a geography within which the coupon is eligible for use to purchase the item;
- a jurisdiction within which the coupon is eligible for use to purchase the item; and
- a set of said merchants from whom the coupon is eligible for the purchase of the item.

13. The method, as defined in claim 12, wherein the authorization request message includes data to derive whether:
- the time of the transaction is within the time of the predetermined set of conditions within which the coupon is eligible for use to purchase the item;
- a location within which the transaction is taking place is within the geography of the predetermined set of conditions within which the coupon is eligible for use to purchase the item;
- a jurisdiction within which the transaction is taking place is within the jurisdiction within which the coupon is eligible for use to purchase the item; and
- the merchant is with the set of said merchants from whom the coupon is eligible for the purchase of the item.

\* \* \* \* \*